No. 791,087. PATENTED MAY 30, 1905.
I. DEUTSCH.
UNIVERSAL JOINT.
APPLICATION FILED OCT. 24, 1904.
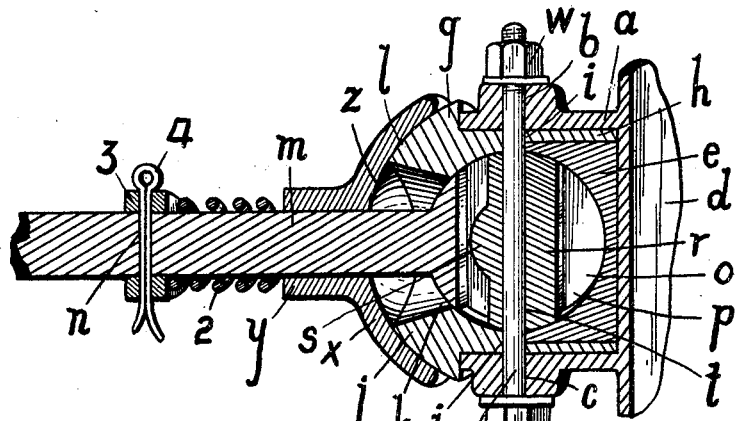
Fig. 1.
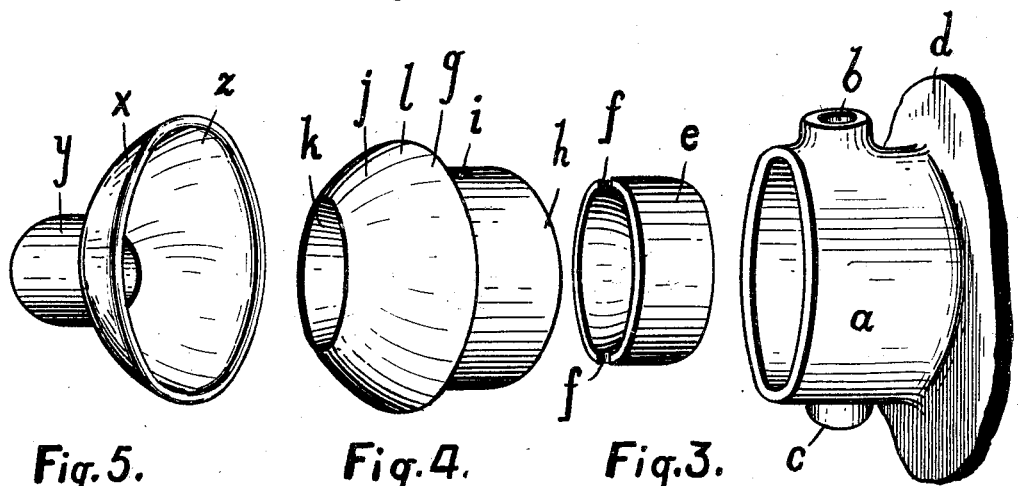
Fig. 5. Fig. 4. Fig. 3. Fig. 2.
Fig. 6. Fig. 7.
Witnesses. Inventor.
J. E. Blackmore Isidor Deutsch
Grace Tresidder by E. J. Featherstonhaugh
    atty.

No. 791,087. Patented May 30, 1905.

UNITED STATES PATENT OFFICE.

ISIDOR DEUTSCH, OF MONTREAL, CANADA, ASSIGNOR TO ELECTRIC AND TRAIN LIGHTING SYNDICATE, LIMITED, OF MONTREAL, CANADA, A CORPORATION OF CANADA.

UNIVERSAL JOINT.

SPECIFICATION forming part of Letters Patent No. 791,087, dated May 30, 1905.

Application filed October 24, 1904. Serial No. 229,774.

*To all whom it may concern:*

Be it known that I, ISIDOR DEUTSCH, a citizen of the United States of America, residing at Montreal, in the district of Montreal, Province of Quebec, Canada, have invented certain new and useful Improvements in Universal Joints, of which the following is a specification.

This invention relates to an improvement in universal-joint coupling as described in the present specification and illustrated by the accompanying drawings, that form part of the same.

The improvement consists, essentially, in a ball having a suitable slot and rigid with a shaft at the end thereof, a casing forming a receptacle, a plurality of socket members contained therein and partially encompassing said ball, and means for retaining said members in said receptacle.

The objects of the invention are to devise a joint easy to lubricate and cheap to manufacture and in which the liability to wear and accidents in universal-joint coupling when employed under severe conditions will be minimized and to simplify the assembling, thus facilitating the inspection and renewal of parts.

In the drawings, Figure 1 is a longitudinal sectional view of the joint having a cap-spring held to the outer member of the socket. Fig. 2 is a perspective detail of the casing. Fig. 3 is a perspective detail of the inner member of the socket. Fig. 4 is a perspective detail of the outer member of the socket having the inwardly-extending cylindrical portion to receive the inner member. Fig. 5 is a perspective detail of the cap. Fig. 6 is a perspective detail of the slotted ball and a portion of the shaft. Fig. 7 is a perspective detail of the bushing fitting into the slot in the ball.

Like letters of reference indicate corresponding parts in each figure.

Referring to the drawings, $a$ is the casing of the joint having the orifices $b$ and $c$ therethrough diametrically opposite one to the other.

The casing $a$ extends from and preferably forms part with the plate $d$, which may be secured to a driven wheel or connected to another link or shaft.

$e$ is the inner member of the socket having a cup-shaped interior and the notches $f$ in the edge thereof diametrically opposite one to the other.

$g$ is the outer member of the socket having the cylindrical inwardly-extending portion $h$ for the reception of the inner member $e$ and the orifices $i$ diametrically opposite one to the other.

$j$ is the outer portion of the outer member having a cup-shaped interior and the central opening $k$ therethrough converging toward its inner end and the arc-shaped periphery 1 extending from the opening $k$ to the edge.

The outer portion $j$ preferably overhangs or extends beyond the inner portion $h$.

$m$ is a shaft having the orifice $n$ therethrough.

$o$ is a ball at the end of the shaft and preferably forming part therewith and having a slot $p$ made therein from the inner end in alinement with the aforesaid shaft.

$r$ is a bushing fitting into the slot $p$ and having a reinforcing protuberance $s$ and a central orifice $t$.

The ball $o$ in position is held in the socket formed by the cup-shaped interior of the outer and inner members, the cylindrical portion $h$ receiving the inner member $e$.

The ball $o$ is almost completely encompassed in the socket so formed, a small portion of its surface being left free to permit the shaft $m$, which extends through the opening $k$, to assume different angular positions in relation to the plate $d$.

$u$ is a pin having the head $v$ and inserted through the orifices in the casing and outer member, respectively, and also engaging in the notches $f$. The pin $u$ is firmly held in place by a suitable nut $w$.

The parts described in detail in the foregoing description and assembled, as explained, are operative; but where dust and grit are liable to interfere with the working a cover is necessary and may be considered a salient feature in the invention.

*x* is a cup extending from the sleeve *y*, encircling the shaft and having an inner surface *z* concentric with the arc-shaped periphery 1 of the outer member.

2 is a spiral spring encircling the shaft and abutting the ring portion *y* and the stop 3 on the shaft and exerting an inward pressure on the cap.

The stop 3 is held in position on the shaft by a cotter-pin 4 inserted through said stop and the orifice *n*.

It will be seen from the foregoing description that the members forming the socket for the ball are readily removable, and therefore easily replaced, as they form, substantially, bushings for the ball within the outer casing.

The one pin serves the purpose of securing all the parts of the joint, and it is so arranged that the wear and strain are to a great extent minimized. Particularly is this noticeable in providing a bushing in the slot in the ball to take most of the wear and strain which would otherwise be on the pin.

The lubrication of this joint is very simple, as a small quantity of oil may be retained in the socket for a long period, for the centrifugal force emanating from the rotation of the joint will not permit its escape.

The cap or cover for the joint is a very important feature from the fact that the troubles incident to the entrance of dust and grit into a joint will be entirely eliminated.

What I claim as my invention is—

1. A universal-joint coupling comprising a shaft, a ball, having a suitable slot, at the end of said shaft and rigid therewith, a casing forming a receptacle and having diametrically-arranged orifices therethrough, a plurality of socket members contained in said receptacle and partially encompassing said ball, and a pin securing said members with said casing and passing through the ball, as and for the purpose specified.

2. A universal-joint coupling comprising a shaft, a ball, having a suitable slot, at the end of said shaft and rigid therewith, a casing forming a receptacle and having diametrically-arranged orifices therethrough, an inner socket member having a cup-shaped interior, an outer socket member having a central opening through which the shaft extends and a cup-shaped interior and a cylindrical inner portion surrounding the aforesaid inner member and extending into said receptacle, and a pin securing said members with said casing and passing through said ball, as and for the purpose specified.

3. A universal-joint coupling comprising a shaft, a ball, having a suitable slot, at the end of said shaft and rigid therewith, a casing forming a receptacle and having diametrically-arranged orifices therethrough, a plurality of socket members contained in said receptacle and partially encompassing said ball, a bushing inserted in the slot in the aforesaid ball, and a pin securing said members within said casing and extending through said bushing, as and for the purpose specified.

4. A universal-joint coupling comprising a shaft, a ball, having a suitable slot at the end of said shaft and rigid therewith, a casing forming a receptacle and having diametrically-arranged orifices therethrough, an outer socket member having a cylindrical inner portion extending into said receptacle and orifices therethrough in alinement with the aforesaid orifices and a central opening through which the shaft extends, an inner socket member having a cup-shaped interior and received within said cylindrical extension of the outer member and notches in the edge thereof in alinement with the aforesaid orifices, a bushing in the slot of the ball, and a pin suitably secured and inserted in said bushing and orifices, as and for the purpose specified.

5. A universal-joint coupling comprising a shaft, a ball, having a suitable slot, at the end of said shaft and rigid therewith, a casing forming a receptacle, an inner socket member, an outer socket member having a central opening therethrough and an arc-shaped periphery extending from said opening, said members partially encompassing said ball and suitably secured in said receptacle, and a cap extending from said shaft and abutting said arc-shaped periphery, as and for the purpose specified.

6. A universal-joint coupling comprising a shaft, a ball, having a suitable slot, at the end of said shaft and rigid therewith, a casing forming a receptacle, an inner socket member, an outer socket having a central opening and an inner cylindrical portion receiving said inner member and an arc-shaped periphery extending from said central opening on the outer portion, said members partially encompassing said ball, and suitably secured in said receptacle, and a cap extending from a sleeve on the shaft over said arc-shaped periphery, and a spiral spring encircling said shaft and abutting said sleeve to exert pressure thereon, as and for the purpose specified.

7. In a device of the class described, in combination, a shaft, a ball at the end thereof and rigid therewith and having a slot made therein in alinement with the shaft, an inner socket member, an outer socket member having a central opening through its outer wall, means for securing said members together to socket the ball, and a spring-held cap extending from the shaft and covering said opening, as and for the purpose specified.

8. In a device of the class described, in combination, a shaft, a ball at the end thereof and rigid therewith and having a slot made therein in alinement with the shaft, a bushing having an orifice therethrough and fitting within said slot, and a plurality of members to form a socket for the ball and one of said members having a suitable central opening through which the shaft extends, and means for securing said members substantially integral, as and for the purpose specified.

Signed at Montreal, in the district of Montreal, in the Province of Quebec, Canada, this 21st day of October, 1904.

ISIDOR DEUTSCH.

Witnesses:
J. E. L. BLACKMORE,
GRACE IRESIDDER.